United States Patent

Schmidt et al.

[11] 3,731,612
[45] May 8, 1973

[54] PHOTOGRAPHIC DEVELOPING DEVICE

[75] Inventors: Frederick W. Schmidt, Bedford Heights; William P. Hamilton, Cleveland, both of Ohio

[73] Assignee: Horizons Incorporated, a division of Horizons Research Incorporated, Cleveland, Ohio

[22] Filed: Sept. 22, 1971

[21] Appl. No.: 182,642

[52] U.S. Cl..................95/89 R, 219/216, 240/47
[51] Int. Cl..............................................G03d 13/00
[58] Field of Search....................95/89 R; 219/216; 355/100, 106; 240/47

[56] References Cited
UNITED STATES PATENTS

| 3,202,070 | 8/1965 | Pratt et al............................355/100 |
| 3,033,980 | 5/1962 | Pickering et al.......................240/47 |
| 3,397,630 | 8/1968 | Pratt...................................355/106 |

Primary Examiner—Samuel S. Matthews
Assistant Examiner—Fred L. Braun
Attorney—Lawrence I. Field

[57] ABSTRACT

An apparatus for optical development of images in non-silver organic free radical photosensitive media. The apparatus provides uniform high intensity radiation of desired wavelengths without accompanying heat or infrared (IR) radiation which is detrimental to the apparatus and to the photosensitive medium.

3 Claims, 2 Drawing Figures

INVENTOR
FREDERICK W. SCHMIDT &
WILLIAM P. HAMILTON

BY
ATTORNEY

PHOTOGRAPHIC DEVELOPING DEVICE

The invention herein described was made under a contract with the United States Air Force.

This invention relates to a cold red light source of illumination to be used in photochemical development of non-silver organic free radical films, as described in U.S. Pat. No. 3,510,300 and in 3,573,046 and is an improvement of the photochemical developing apparatus described in U.S. Pat. No. 3,573,046 and in U.S. Pat. application Ser. No. 766,160, filed Oct. 9, 1968, now Pat. No. 3,618,504 the disclosures of which are intended to be incorporated herein by reference.

Free radical photographic systems have the unique advantage that the latent image can be developed by flooding the entire film with radiative energy in the red or infrared region. A latent image dye is formed from its precursors by the original exposure to visible or near ultraviolet light. It appears that the dye, in turn, has the ability to absorb red and/or infrared photons and use them to form additional dye molecules from neighboring dye precursors. Less light of shorter wavelengths during development allows more development before the fog level reaches the maximum allowable. Less radiation of longer wavelengths reduces thermal fog.

In order to obtain optimum results in the development of free radical films, it is necessary to utilize a high intensity source for the radiation provided for development and such sources usually provide a large amount of heat in addition to the desired radiation. The heat may be considered "noise", and in contrast to the desired actinic radiation which is "signal".

One object of the invention is to provide development radiation having a high signal-to-noise ratio of actinic to visible intensities and actinic to infrared intensities.

Another object of the invention is to provide the red and near-infrared radiation for development of organic free radical films in a manner that is more effective and more uniform than has heretofore been possible.

Another object of the invention is to provide a simpler and more versatile apparatus than the prior art apparatus noted above.

Still a further object is to provide an apparatus in which the peak sensitivity of the developing radiation is readily changed to accommodate the spectral sensitivity of the particular film being processed.

Still another object is elimination of the water filter, and mechanical drive of previously known units and to provide an apparatus for simultaneously achieving greater intensity, more uniformity, better control of waveband, higher signal-to-noise ratio, operating with lower wattage and less heat output, thereby yielding higher photo speeds, more latitude for gamma control and better general appearance of the free radical films developed.

These and other objects are accomplished by the use of the method and apparatus hereinafter described taken in connection with the drawings in which.

Figure 1:
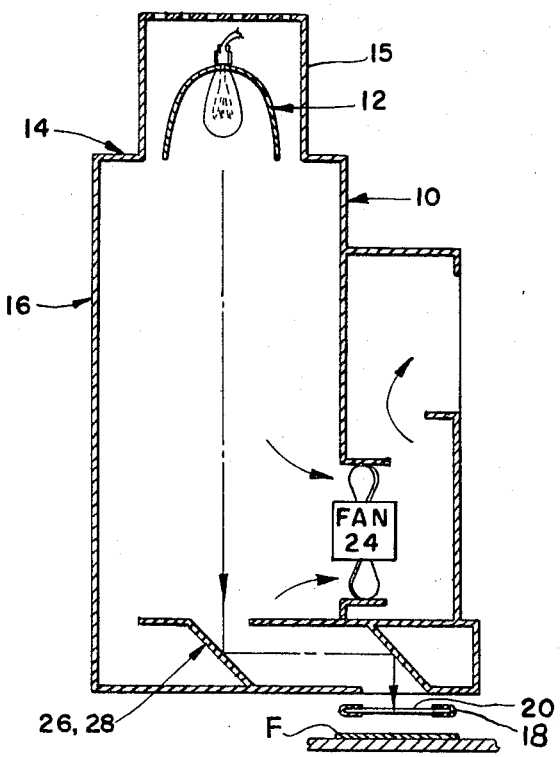
FIG. 1 is a schematic plan view of a preferred apparatus.

Briefly, the apparatus includes an enclosure 10 having a source of radiation 12 mounted at one end of the apparatus, opposite the end at which a film F is exposed to the radiation. The enclosure comprises an upper well 15 in which the radiation source 12 is supported. One suitable source of radiation is a 650 watt DVY Quartzline (Registered Trademark) sun gun. Vertical sidewalls 16 may enclose a square, rectangular, oval or cylindrical or other configured space. Adjacent to the film and positioned between the film plane and the lower end of enclosure 10 is a support or shelf 18 for one or more Wratten type filters or other transmission filters 20.

In line with the axis passing through the radiation source and preferably at an angle of 45° to the plane of filter 20, is the first series of dichroic filters 26, 28.

To remove a substantial portion of the heat and to protect the filter 20 from overheating and fracturing, a fan 24 is positioned in an opening in wall 16. Fan 24 expels heated air from the enclosure 10 and sucks air into the enclosure from the filter end thereof, thereby effecting a flow of air along the surfaces of filters 20, 26, 28. Fan 24 also sucks air into the enclosure past the source 12 and ultimately all the air is expelled from the enclosure.

As shown in FIG. 1, it is preferred to utilize two dichroic filters 26, 28, one of which serves to determine the short wavelength cutoff and the other of which can be used to determine the long wavelength cutoff. A third dichroic, if used, may be the same as the first or last filter, depending on which end of the waveband is intended to have the sharpest cutoff.

It is also possible to provide only one dichroic filter which will provide a gradual cut off and cut on of the wavelengths of the radiation from the source 12.

As shown in FIG. 1, the radiation passed by the dichroics can be further modified by the use of one or more of the usual Wratten filters, disposed to receive radiation from which most of the IR and heat have been removed. The relatively delicate Wratten filter 20 is positioned downstream from the dichroics 26, 28. Heretofore, the Wratten filters were not usable in a practical sense because of the heat generated and passed from the previously used radiation sources.

The apparatus includes means for positioning a film to be photochemically developed into the path of the radiation passed by the train of filters. Any suitable means may be provided for bringing individual exposures or a reel may be passed out intermittently by any conventional film feeding means.

The dichroic unit consists of a 650 watt GE DVY tungsten lamp in a Sylvania Super 8 sun gun which is a well optimized tungsten source for radiometric intensity in the red, and collection for projection through a relatively small aperture. The halogen cycle, however, insures relatively constant color temperature until a relatively sudden burn out.

A fan 24 is positioned to cool both the lamp from back to front and the dichroics and cut-off filter by pulling air into the apparatus. The filters are positioned to prevent any stray light from the lamp house from bypassing both dichroics and still hitting the film platen directly.

Utilizing Kodak No. 301 dichroics in the apparatus described has been found to effectively dump the heat beyond 700 nm so that glass filters, especially the absorbing type, no longer break from its absorption beyond 900 nm.

Figure 2:
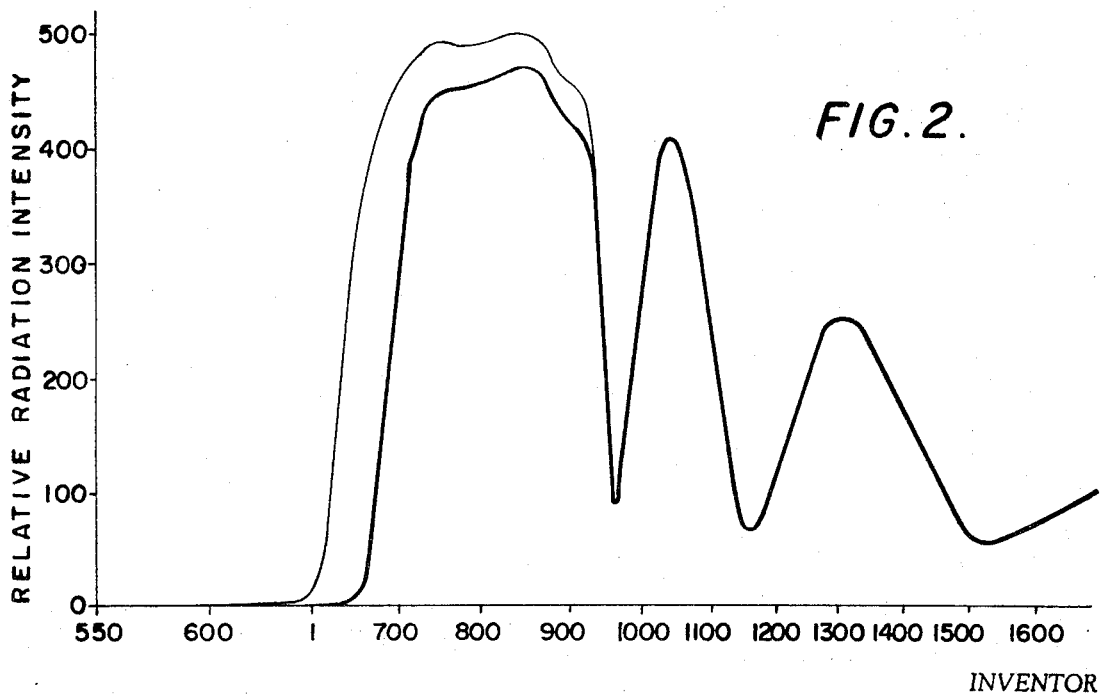
FIG. 2 is a graphical representation showing the radiation provided by the apparatus of FIG. 1.

FIG. 2 shows the opening of the red/IR window of the Kodak No. 301 SWP (changing these dichroics optimizes the unit for other films) dichroic and the cutoffs of the red filters of interest. The curves are plots of relative intensity vs. wavelength. The dichroic was placed in the light path at a 45° angle. Moving it away from the 45° angle shifts the reflection cutoff to shorter or longer wavelengths, since the effective depth of optical coatings is increased or decreased. The curves are empirical measurements of the radiation that actually floods the film, and can thereby be directly related with the film results experienced.

We claim:

1. An apparatus for photochemically developing visible images from latent images existing in non-silver free radical photographic film which comprises:
   an enclosure having an opening at one end wall thereof;
   means for positioning a film bearing a latent image adjacent to said opening;
   a high intensity light source positioned adjacent to the other end wall of said enclosure, for illuminating said film bearing the latent image which is to be developed;
   means disposed in said enclosure between said light source and said film, for filtering a substantial portion of the visible and infrared radiation emitted by said light source from the radiation delivered to the photographic film to be developed, said means comprising at least two dichroic filters supported so that they are parallel to each other and so that each of them is inclined 45° to the path of the radiation delivered by said light source to said film.

2. The apparatus of claim 1 including, in addition, at least one means for effecting a movement of cool air along the surface of said dichroic filters.

3. The apparatus of claim 1 including, in addition, at least one transmission filter positioned downstream from said dichroic filters.

* * * * *